US012695741B2

(12) United States Patent
Ebel et al.

(10) Patent No.: US 12,695,741 B2
(45) Date of Patent: Jul. 28, 2026

(54) WEB-BASED WORKING DEVICE SYSTEM AND ASSOCIATED DATA ACCESS METHOD

(71) Applicant: Andreas Stihl AG & Co. KG, Waiblingen (DE)

(72) Inventors: Leslie Fabiola Ebel, Schwaikheim (DE); Martin Bobert, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 287 days.

(21) Appl. No.: 18/529,454

(22) Filed: Dec. 5, 2023

(65) Prior Publication Data
US 2024/0187404 A1 Jun. 6, 2024

(30) Foreign Application Priority Data
Dec. 6, 2022 (EP) ..................................... 22211749

(51) Int. Cl.
*G06F 15/16* (2006.01)
*H04L 9/40* (2022.01)
(52) U.S. Cl.
CPC ................................. *H04L 63/083* (2013.01)
(58) Field of Classification Search
CPC ................................................... H04L 63/083
See application file for complete search history.

(56) References Cited

U.S. PATENT DOCUMENTS

2007/0047567 A1* 3/2007 Suzuki .................... H04L 41/08
                                                        370/468
2015/0370615 A1* 12/2015 Pi-Sunyer ................ F24F 11/48
                                                        719/328
2018/0292827 A1 10/2018 Artes et al.
2019/0372977 A1 12/2019 Ben-David et al.

FOREIGN PATENT DOCUMENTS

EP          2 870 852 A1      5/2015
EP          3 876 127 A1      9/2021
WO     WO 2017/097893 A2      6/2017

* cited by examiner

*Primary Examiner* — Normin Abedin
(74) *Attorney, Agent, or Firm* — Crowell & Moring LLP

(57) ABSTRACT
A web-based working device system includes at least one working device, preferably a gardening or forestry tool, a data provision apparatus for providing device information data and operational setting data relating to the working device, a device-side data communication unit, a long-range data exchange connection, in particular an Internet connection, between the device-side data communication unit and the data provision apparatus, a device app with read/write access to the operational setting data relating to the working device in the data provision apparatus, a user terminal for user-side operation of the device app, a service app with read access to the device information data in the data provision apparatus and with temporary write access to the operational setting data relating to the working device that are provided by the data provision apparatus, wherein the temporary write access requires a user-side access enable via the device app, and a service terminal for service-side operation of the service app.

20 Claims, 2 Drawing Sheets

1

WEB-BASED WORKING DEVICE SYSTEM AND ASSOCIATED DATA ACCESS METHOD

CROSS REFERENCE TO RELATED APPLICATION

This application claims priority under 35 U.S.C. § 119 from European Patent Application No. 22211749.1, filed Dec. 6, 2022, the entire disclosure of which is herein expressly incorporated by reference.

BACKGROUND AND SUMMARY

The invention relates to a web-based working device system having at least one working device, a data provision apparatus for providing device information data and operational setting data relating to the working device, a device app with read/write access to the operational setting data relating to the working device in the data provision apparatus, and a user terminal for user-side operation of the device app, and to an associated data access method for accessing the operational setting data relating to the at least one working device that are provided by the data provision apparatus.

The working device can be, for example, a gardening or forestry tool, such as a chainsaw or a robotic lawnmower, a construction working device used in construction technology, a DIY device, such as a hand drill or a cordless screwdriver, a robotic vacuum cleaner, etc. The device information data may include, in particular, data relating to the serial number, device model, and status information, such as information about any error states, maintenance information, and information about available communication paths, such as a mobile radio connection and/or a Wi-Fi connection.

Web-based working device systems and associated data access methods of this kind are widely known and are increasingly being used in recent times to enable the user to be able to operate the respective working device at least partially via the World Wide Web or to influence its operation if necessary. A smartphone or a tablet is usually used as the user terminal, although other terminals are also used, depending on the case, such as smartwatches, augmented reality (AR) glasses, as well as laptops and/or portable personal computers. The user terminal can be used to operate the device app which is associated with the working device and can be used to communicate with the working device, for example via the Internet. In particular, the user can view, i.e. read, operational setting data relating to the working device via the device app and, if necessary, can also change said data by means of appropriate write access. The term app is used here in the present case in its broad meaning as application software, which in particular includes mobile apps, web apps and desktop apps.

Laid-open publication WO 2017/097893 A2 discloses a web-based working device system in which the working device is a mobile autonomous service robot, e.g. a floor cleaning robot or a robotic lawnmower. In this system, the robot and a mobile, user-side terminal for controlling the robot can communicate either via a local wireless communication connection or via an indirect communication connection mediated by a communication server, wherein an attempt is made to change the communication connection if one of the two connections breaks or cannot be established.

If the user of a working device has any questions or wishes regarding the operation of his device, as in the case of activation or in the case of problems during operation of the device, the user usually turns to appropriate support or service, i.e. a service point, such as a dealer or customer service authorized by the manufacturer of the working device. Traditionally, the user brings the working device to the service point so that the latter can fix the problem on site or can change the operational settings of the working device in the manner desired by the user, or the user asks the service point for the desired information, with which the user can then try to carry out the relevant interventions on his working device, for example in order to eliminate a problem during operation of the working device or to change operational settings of the working device.

It is an object of the invention to provide a web-based working device system and an associated data access method of the type mentioned at the outset which offer further improvements compared to the prior art, in particular with regard to efficient service support for device users with efficient access control to device-related data.

The invention achieves this and other objects by providing a web-based working device system having a specific novel combination of features, and by providing a data access method also having a specific novel combination of features and allowing to access operational setting data relating to a working device that are provided by a data provision apparatus by means of a service app.

Advantageous developments of the invention are specified in the dependent claims, the wording of which is hereby made part of the description by reference. This in particular also includes all of the embodiments of the invention that arise from the combinations of features which are defined by the dependency references in the dependent claims.

The web-based working device system according to the invention comprises any number of one or more working devices, such as a gardening or forestry tool, and further comprises the data provision apparatus for providing device information data and operational setting data relating to the working device, a device-side data communication unit, and a long-range data exchange connection, in particular an Internet connection, between the device-side data communication unit and the data provision apparatus, a device app with read/write access to the operational setting data relating to the working device in the data provision apparatus, a user terminal for user-side operation of the device app, a service app with read access to the device information data in the data provision apparatus and with temporary write access to the operational setting data relating to the working device that are provided by the data provision apparatus, wherein the temporary write access requires a user-side access enable via the device app, and a service terminal for service-side operation of the service app. It is understood that the service app also has read access to the operational setting data relating to the working device, as required. This read access can be authorized in the same way as the temporary write access in corresponding embodiments, but this is not mandatory. In other words, the read access to the operational setting data relating to the working device may be authorized in a different, customary manner, e.g. in a similar manner to the authorization of the read access to the device information data or alternatively in another conventional manner.

The data provision apparatus may comprise in particular a data memory with associated peripheral components and may be, for example, in the form of a database with a conventional database structure or database architecture and/or in the form of a cloud backend of a conventional structure and/or in the form of an Internet of Things (IoT) platform of a conventional structure. Depending on requirements and the application, the data provision apparatus may in this case comprise, in a manner known per se, further services implemented in software and/or hardware, such as object memories, programming interfaces, microservices and/or SQL (Structured-Query-Language) or noSQL databases. Depending on requirements, the data provision apparatus can be configured to store the device information data to be provided and/or the operational setting data to be provided for a longer period of time or to hold said data only for a short period of time, e.g. in the form of a non-historicizing, pure retention of the data, for example only until a next status update.

In the present case, the long-range data exchange connection is used to mean a data exchange connection with a range that is longer than typical local ranges in the range of up to a few ten meters, in particular an Internet connection. In contrast, a data exchange connection with a range in the range of up to a few ten meters is referred to as a short-range data exchange connection in the present case.

The aforementioned properties of the web-based working device system of the invention provide favorable conditions for efficient service support for users of the working device(s) of the system with efficient access control and high operational security with respect to data relating to the respective working device, in particular the device information data and operational setting data provided by the data provision apparatus. In particular, this system makes it possible to efficiently perform operational settings of the working device by means of support, such as a customer service or a dealer. The support, i.e. the service point, can be requested by the user regarding a corresponding support/service intervention and can carry out directly, i.e. synchronously, optionally in real time, a corresponding intervention in the working device data, such as reading device information data and reading and/or changing operational setting data relating to the working device. In particular, if the user asks for help, the support/service point can use the service app to request data access from the user's device app, and the user can then suitably enable access temporarily, e.g. also via the device app. Alternatively, the access request can be made in a different, inherently conventional way, e.g. via a request by telephone, by e-mail or the like.

In advantageous embodiments, the service app is in the form of a web-based service app.

The system is thus configured to allow write access to the operational setting data relating to the working device via the web-based service app, for example, only temporarily and only when the user has enabled this via the device app. Additional software for the interaction between support and the working device is not absolutely necessary; this interaction can be effected by appropriate system design via the already existing device app.

If designed appropriately, this working device system can largely avoid duplication of functions, which is highly advantageous in particular for relatively complex functions, thereby also being able to avoid competing access attempts. Edge cases on the side of the working device and/or on the side of the data provision apparatus can thus be very easily avoided.

The system contributes to a high level of user satisfaction, since in many cases a workshop visit for the user can be omitted. In addition, the user retains access sovereignty over the operational settings of his working device by virtue of the fact that the support/service point can only make changes to these settings temporarily and only after the user has given approval. It is further advantageous that, in the working device system according to the invention, the device information data and operational setting data relating to the working device are located outside said system in the data provision apparatus, as a result of which is not necessary for the service/support point to directly access the working device.

In one development of the invention, the device-side data communication unit is located in the working device or is formed by a communication intermediate station which is assigned a short-range data exchange connection to the working device. In the former case, the working device itself is equipped with the associated data communication unit; in the latter case, the communication intermediate station is located outside the working device, either in another of a plurality of working devices or as a separate unit outside all working devices. In this case, the communication intermediate station is preferably assigned to a plurality of working devices together and is located locally in the area of the assigned working devices, with the result that the working devices can communicate via the short-range data exchange connection with the communication intermediate station and via this in a clustered manner with the data provision apparatus.

In one development of the invention, the temporary write access of the service app to the operational setting data relating to the working device includes an access request from the service app to the device app for the working device, wherein the access request requires user-side enable. This measure advantageously results in the data access for the service app for the purpose of temporary write access to the operational setting data relating to the working device being enabled by the user in such a way that the service app makes a corresponding access request to the device app, which can then be enabled by the user. This means that the communication channel between the service app and the device app is also advantageously used for this access request. Alternatively, it is possible to provide another, conventional implementation for requesting the required data access from the service side to the user side.

In one configuration of the invention, the access request is a token-based access request and is selectable via a jump, e.g. in the form of a call or link, in the service app to the device app. This type of access request is advantageous in terms of ease of use and data security. The service point only needs to select the relevant jump in the service app for the access request.

In one configuration of the invention, the device information data comprise device identification data which are used by the service app to identify the working device for the access request to the device app and/or for the temporary write access to the operational setting data relating to the working device that are provided by the data provision apparatus. This measure allows the service side to easily identify the working device in question for which a user requests service assistance. Alternatively, other, conventional types of device identification for the service side are possible, e.g. a direct transmission of corresponding device identification data from the user side to the service side.

In one development of the invention, the temporary write access is part of read/write access with write access for a predefined write access period and read access for a predefined read access period, wherein the read access period is equal to or longer than the write access period. This is an advantageous stipulation for most applications for the maximum access periods during which the service side is able to have temporary read and/or write access to the corresponding device data. Alternatively, if this is preferred for certain applications, the read access period may be stipulated to be shorter than the write access period.

In one development of the invention, the service app prematurely terminates enabled temporary write access to the operational setting data relating to one of a plurality of working devices when it sends a new access request for temporary write access to the operational setting data relating to another working device to its associated device app. This measure easily avoids any data access collisions. Alternatively, the system can be designed for simultaneous processing of write accesses to the operational setting data relating to a plurality of working devices.

In one development of the invention, the user terminal is a smart device, in particular a smartphone or a tablet or a portable personal computer or a wearable device, i.e. a device worn on the body, such as a smartwatch or augmented reality (AR) glasses. This allows such widely used terminals to be used as the user terminal for the working device system according to the invention.

In one development of the invention, the working device is an autonomous working device, e.g. a robotic lawnmower, a robotic vacuum cleaner, a chainsaw, a hedge trimmer, a hedge cutter, a wood cutter, pruning shears, a pole-mounted pruner, a blower, a leaf blower, a suction device, a leaf vacuum, a cleaning device, a high-pressure cleaner, a spreader and/or sprayer, a sweeper, a sweeper roller, a sweeping brush, a lawnmower, grass shears, a scarifier, a brush cutter or another gardening or forestry tool or a construction working device used in the construction industry, such as an angle grinder or a rock cutter, or a DIY device used in the DIY sector. These are advantageous areas of application of the working device system according to the invention, wherein the system can also comprise in particular different working devices, e.g. one or more robotic lawnmowers as well as one or more chainsaws, such as a chainsaw and a mower for the same user.

The data access method according to the invention is particularly suitable for the web-based working device system according to the invention and is used to access the operational setting data relating to at least one working device that are provided by a data provision apparatus by means of a service app. According to this data access method, a service request comprising identification information and service request information for the working device is transmitted, i.e. sent, on the user side. The service request is received on the service side and an access request is sent from the service app to a device app for temporary write access to the operational setting data relating to the working device that are provided by the data provision apparatus. The access request is received on the user side via the device app and the requested temporary write access to the operational setting data relating to the working device that are provided by the data provision apparatus is enabled. The operational setting data relating to the working device in the data provision apparatus are read by the service app by read access and are changed if necessary by write access during the enabled temporary write access corresponding to the service request information. After a predefined enable period has expired, the enabled temporary write access is automatically terminated. Due to these properties, the data access method according to the invention analogously has the functionalities and advantages mentioned above for the web-based working device system according to the invention.

In one development of the data access method according to the invention, data are exchanged between a device-side data communication unit and the data provision apparatus via a long-range data exchange connection, in particular an Internet connection. This enables the desired data exchange between the device-side data communication unit on the one hand and the data provision apparatus on the other hand, even if these are at a correspondingly large spatial distance from each other.

In one configuration of the data access method according to the invention, the device-side data communication unit is arranged in the working device or is formed as a communication intermediate station which exchanges data with the working device via a short-range data exchange connection. For the advantages and effects of this measure, reference can be made to the analogous statements above with regard to the appropriately developed working device system.

In one development of the data access method according to the invention, the access request is formed by a token-based access request and selected via a jump in the service app to the device app. For the advantages and effects of this measure, reference can be made to the analogous statements above with regard to the appropriately configured working device system.

In one development of the data access method according to the invention, the service app uses device identification data as device information data for identifying the working device for the access request to the device app and/or for the temporary write access to the operational setting data relating to the working device that are stored in the data provision apparatus. For the advantages and effects of this measure, reference can be made to the analogous statements above with regard to the appropriately configured working device system.

In one development of the data access method according to the invention, the enable period for write access is predefined as the write access period and for read access is predefined as the read access period, wherein the read access period is predefined to be equal to or longer than the write access period. For the advantages and effects of this measure, reference can be made to the analogous statements above with regard to the appropriately developed working device system.

In one development of the data access method according to the invention, enabled temporary write access to the operational setting data relating to one of a plurality of working devices is prematurely terminated when a new access request for temporary write access to the operational setting data relating to another working device is sent from the service app to its associated device app. For the advantages and effects of this measure, reference can be made to the analogous statements above with regard to the appropriately developed working device system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
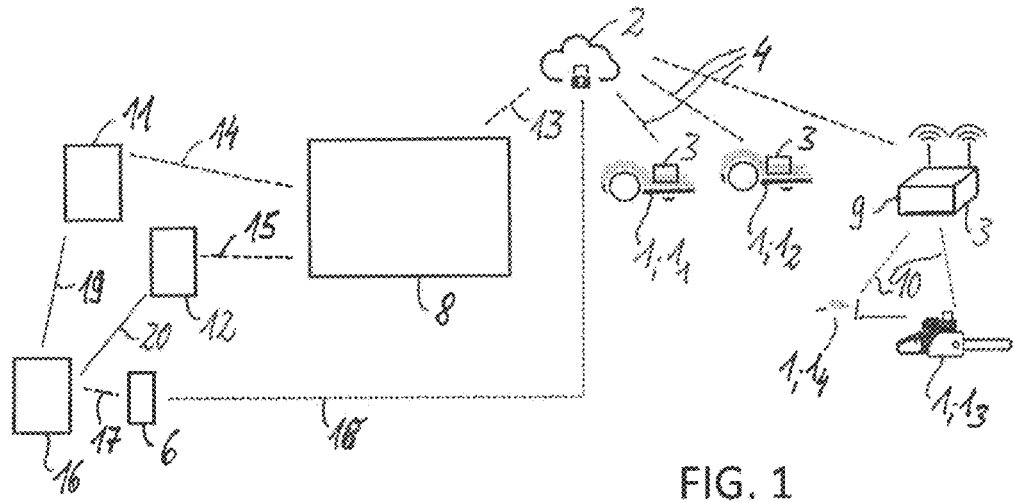
FIG. 1 is a schematic block diagram of a web-based working device system.
Figure 2:
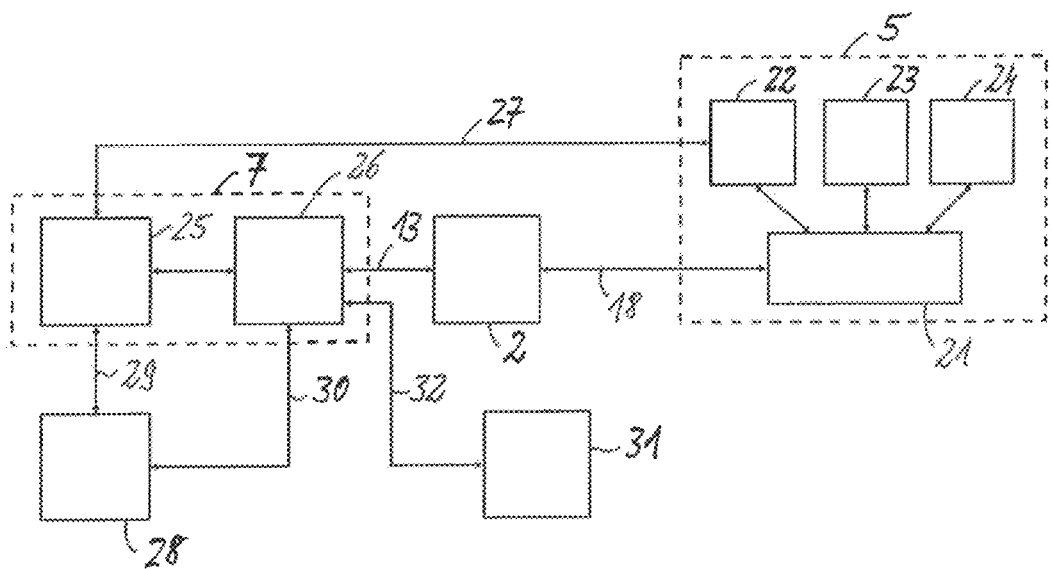
FIG. 2 is a schematic block diagram of a data processing system part of the working device system.

The web-based working device system illustrated in FIGS. 1 and 2 comprises one or more working devices 1, a data provision apparatus 2 for providing device information data and operational setting data relating to the working device 1, a device-side data communication unit 3 and a long-range data exchange connection 4 between the device-side data communication unit 3 and the data provision apparatus 2, a device app 5 with read/write access to the operational setting data relating to the working device 1 in the data provision apparatus 2, a user terminal 6 for user-side operation of the device app 5, a service app 7, e.g. in the form of a web-based service app, and a service terminal 8 for service-side operation of the service app 7.

The respective working device 1 can be in particular a robotic lawnmower, see the working devices 11 and 12 in FIG. 1, a chainsaw or hedge trimmer, see the working devices 13, 14 in FIG. 1, another gardening or forestry tool or any other, autonomous or non-autonomous working device, for example a construction working device used in the construction industry or a DIY device used in the DIY sector or a robotic vacuum cleaner.

The long-range data exchange connection 4 can be, in particular, an Internet connection or a mobile radio connection.

The web-based service app 7 has at least read access to the device information data in the data provision apparatus 2 and temporary write access to the operational setting data relating to the respective working device 1 that are provided by the data provision apparatus 2. In this case, the temporary write access of the service app 7 to the operational setting data relating to the working device 1 requires a user-side access enable via the device app 5, i.e. the write access is only temporary and only possible if it is enabled by the user of the working device 1. In this case, the temporary write access of the service app 7 to the operational setting data relating to the working device 1 is carried out in a suitable manner that is conventional per se via an associated communication connection. In addition, the service app 7 has access to the operational setting data relating to the working device 1 in a suitable, required manner, wherein this read access can be authorized in the same manner as the temporary write access or alternatively in another manner.

In the example shown, the data provision apparatus 2 is in the form of a cloud solution with a cloud structure or cloud architecture known per se to a person skilled in the art, including an associated cloud backend or IoT platform, which does not require any further explanations here. In alternative embodiments, the data provision apparatus 2 may also be, for example, a database whose structure is known per se or a data memory with associated peripheral components.

In corresponding embodiments, the device-side data communication unit 3 is located in the working device 1, in the example shown this is the case with the robotic lawnmowers as working devices 11 and 12, or the device-side data communication unit 3 is formed by a communication intermediate station 9 which is assigned a short-range data exchange connection 10 to the working device 1, as is the case in the example shown for the chainsaws or hedge trimmers as working devices 13, 14. The communication intermediate station 9 can be formed in particular by a gateway with a conventional gateway structure or architecture. Depending on requirements, the short-range data exchange connection 10 can be, for example, a short-range radio connection, such as a Bluetooth connection, or the like. The communication intermediate station 9 is configured in particular to receive data transmitted over a short range by the coupled working devices 13, 14 and to transmit said data via the long-range data exchange connection 4 to the data provision apparatus 2 that is usually arranged spatially far away. Conversely, the communication intermediate station 9 is also able to receive data transmitted over a long range by the data provision apparatus 2 and, if necessary, to forward said data to the coupled working devices 13, 14. The communication intermediate station 9 can optionally be designed such that, for the coupled working devices 1, it takes over at least some of the data processing functionalities which are relevant to the operation of the working device 1 and are otherwise implemented in the working device 1 itself.

In advantageous embodiments, the temporary write access of the service app 7 to the operational setting data relating to the working device 1 includes an access request of the service app 7 to the device app 5 that is to be enabled on the user side. Only if the user of the working device 1 responds positively to this access request and thus enables it, e.g. via his device app 5, is it possible for the service app 7 to change the operational setting data relating to the associated working device 1 by write access.

In corresponding embodiments, the access request is a token-based access request that can be selected on the service side via a jump, such as a link, in the service app 7 to the device app 5.

In advantageous implementations, the device information data comprise device identification data, i.e. data for identifying the relevant working device 1, wherein the service app 7 uses these device identification data to identify the working device 1 for the access request to the device app 5 and/or to perform the temporary write access to the operational setting data for the relevant working device 1 that are provided by the data provision apparatus 2.

In advantageous embodiments, the temporary write access is part of temporary read/write read access of the service app 7 to the operational setting data relating to the working device 1 that are provided by the data provision apparatus 2, which comprises write access for a predefined write access period and read access for a predefined read access period, wherein the latter is preferably equal to or longer than the write access period.

In advantageous embodiments, the service app 7 prematurely terminates enabled temporary write access to the operational setting data relating to one of a plurality of working devices 1 when it sends a new access request for temporary write access to the operational setting data relating to another working device 1 to its associated device app 5.

In corresponding implementations, the user terminal 6 is a smart device, for example a smartphone, a tablet, a portable personal computer, a smartwatch or AR glasses.

The service terminal 8 is located at a service point. In the example shown in FIG. 1, a support service 11 or a dealer service 12 can access the service terminal 8 and can use it to communicate with the rest of the web-based working device system, in particular with the data provision apparatus 2, as symbolized with a communication connection 13 in FIG. 1. Depending on requirements, the support service 11 and/or the dealer service 12 can access the service terminal 8 directly, e.g. via corresponding input/output interfaces of the service terminal 8, or via a short-range or long-range communication connection, symbolized in FIG. 1 by connections 14 and 15. An operator or user 16 has a communication connection to the rest of the working device system via his user terminal 6, in particular a connection to the data provision apparatus 2 via a long-range data exchange connection 18. A coupling line 17 symbolizes the interaction between the operator 16 and the user terminal 6 in FIG. 1.

The operator 16 can also directly contact the support service 11 and/or the dealer service 12 in the example shown in FIG. 1, symbolized in FIG. 1 by corresponding connections 19, 20 which may be, for example, a telephone connection or a mobile radio connection.

FIG. 2 illustrates in more detail a possible implementation for the structure or architecture of the web-based working device system with some individual components that may be partially or wholly designed using hardware or software, depending on requirements. In this embodiment, the device app 5, as shown, includes in particular a device app backend 21 and a front-end part comprising a web front end 22, an iOS front end 23 and an Android front end 24, each with a conventional structure, which does not require a more detailed description here.

Similarly, the service app 7 comprises a service app front end 25 and a service app backend 26. The service app front end 25 has a data exchange connection to the front-end part 22, 23, 24 of the device app 5 via a communication connection 27. The service app backend 26 and the device app backend 21 are in contact with the data provision apparatus 2 or with its cloud backend or IoT platform via the already mentioned long-range data exchange connections 13, 18 which can be, for example, cloud-to-cloud (C2C) communication channels in corresponding embodiments.

In order to authorize or authenticate the service app 7 for the temporary write access operations, the front end 25 and the backend 26 of the service app 7 are connected to a corresponding authentication service 28 via a respective communication channel 29, 30. Depending on requirements and the application, the authorization can include, for example, the measure that the service app user is authorized in the service app and that additional identification and authorization take place within the device app.

Optionally, the service app 7 can have a data exchange connection via its backend 26 to one or more further data provision apparatuses in addition to the data provision apparatus 2, symbolized in FIG. 2 by contact with a database 31 via an associated data exchange connection 32. Such further databases can hold, e.g., data independently of device-specific settings, such as customer data and/or purchase data and/or service data relating to the respective working device 1.

Figure 3:
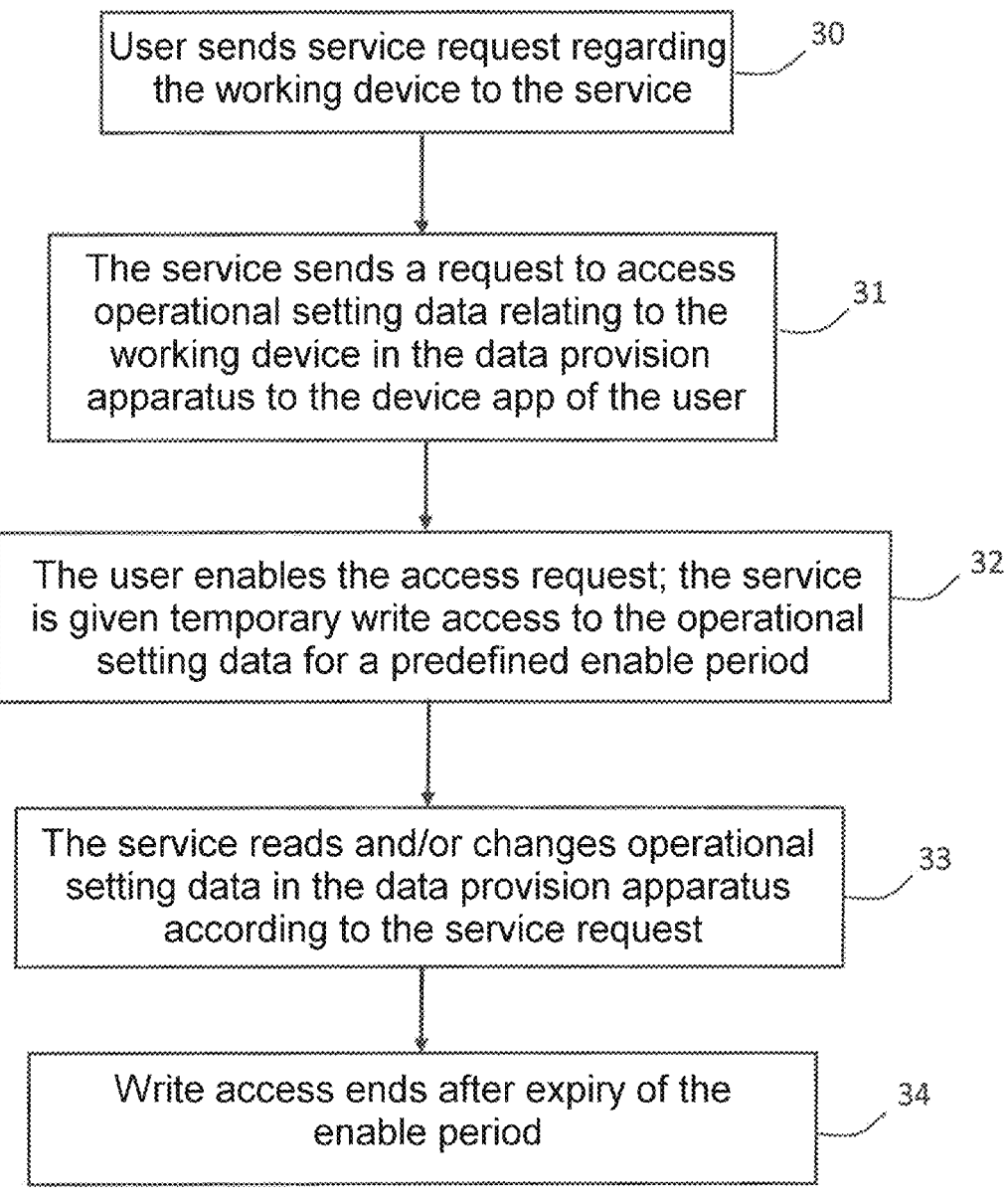
FIG. 3 is a schematic flowchart of a data access method that can be used for the working device system in FIGS. 1 and 2.

FIG. 3 illustrates an advantageous embodiment of the data access method according to the invention using the example of a use in a web-based working device system of the kind shown in FIGS. 1 and 2. The data access method is used here in particular to access all or some of the operational setting data relating to a relevant working device 1 that are provided by the data provision apparatus 2 by means of the service app 7.

First of all, a service request comprising identification information and service request information relating to the affected working device 1 of the user is transmitted for this purpose by the user, i.e. on the user side. The user, also called operator, can contact a support or dealer service for this purpose, for example by telephone, as mentioned above, or by e-mail or a messenger service, see step 30 in FIG. 3. For this purpose, an associated web-based interface can optionally be provided, accompanied by integration of a corresponding operating element or button in the device app. The service request sent by the user is received on the service side, and an access request is then sent to the relevant device app 5 via the service app 7 for temporary write access to the operational setting data relating to the working device 1 that are provided by the data provision apparatus 2, see step 31 in FIG. 3. This access request is received on the user side via the device app 5, and the user then enables the requested temporary write access to the operational setting data relating to the working device 1 that are provided by the data provision apparatus 2, see step 32 in FIG. 3. This enables service personnel to read the operational setting data relating to the working device 1 in the data provision apparatus 2 during the enabled temporary write access corresponding to the service request information from the user by read access via the service app 7 and to change said data by write access, in particular via the communication channel of the device app 5, see step 33 in FIG. 3. After a predefined enable period has expired, the temporary write access enabled only for this period is automatically terminated, see step 34 in FIG. 3.

In advantageous embodiments, the enabled temporary write access to the operational setting data relating to the relevant working device 1 is prematurely terminated when the service sends a new access request for temporary write access to the operational setting data relating to another working device 1 to its associated device app 5 via the service app 7.

The following text briefly shows, using a specific example, how the service request from an operator of a working device incorporated in a system according to the invention can be processed and what advantages this has for the parties involved. For the sake of simplicity, reference is made to the system implementation shown in FIGS. 1 and 2.

For this example, it is assumed that the operator 16 is in possession of a robotic lawnmower as a working device 1 and wants assistance to adapt a predefinable mowing plan for the robotic lawnmower. The operator 16 contacts the support service 11 or the dealer service 12, e.g. by telephone, and still during this contact an employee of the support service 11 or dealer service 12 selects the relevant robotic lawnmower via the service app 7 by means of entered device identification data, such as a serial number or an e-mail address linked to the robotic lawnmower, and then initiates an access request, e.g. a token-based access request, for write access to the operational setting data relating to the robotic lawnmower that are relevant to the mowing plan, which write access is implemented as remote access. For this initialization of the access request, said employee selects, for example, an associated jump to the associated device app 5. The email address linked to the lawnmower may be in particular an email address that is stored in a customer account for the owner of the working device 1.

By allowing the requested data access, the operator 16 temporarily enables the write access to these operational setting data, so that the write access can be executed by the support service 11 or dealer service 12. In this case, the device app 5 exchanges corresponding data with the data provision apparatus 2 which, among other things, holds the operational setting data relating to the relevant robotic lawnmower that are relevant to the mowing plan. In this way, after the write access has been authenticated, the service employee of the support service 11 or dealer service 12 can retrieve, view and if necessary modify said data from the data provision apparatus 2, such as data regarding mowing times, mowing periods, the cutting height or the sensitivity of a device-side rain sensor. The modified operational setting data relating to the robotic lawnmower are then stored in the data provision apparatus 2 again. The only temporary access right benefits from a high level of operational security and/or data protection. In addition, it can optionally be specified that the service employee of the support service 11 or dealer service 12 may only access one working device 1 at any time and the write access is limited, for example, to a maximum write access period of approximately 10 minutes to 20 minutes and the read access is limited to a maximum read access period of approximately 100 minutes to 140 minutes. The read/write access to the working device 1 currently being handled is automatically terminated in a corresponding system implementation when a new access request for read/write access to another working device 1 is started via the service app 7, even if the maximum access time has not yet been reached.

Depending on the system design, data are exchanged between the front end 25 of the service app 7, interfaces of the backend 26 of the service app 7, a backend of the data provision apparatus 2, e.g. a cloud backend, and further interfaces, such as cloud interfaces which can be APIs (Application Programming Interfaces) for example, in order to carry out the read and/or write access to the operational setting data relating to the working device 1 or the communication intermediate station 3.

As the exemplary embodiments shown and the further exemplary embodiments explained above make clear, the invention provides a web-based working device system and a data access method that can be used for such a working device system, which provide advantageous functions in particular with regard to efficient service support for the operators of the working devices with a high level of operational security of device-related data. Servicing services can assist the operator of the working device, for example, in changing operational setting data relevant to the operation of the device, without the operator having to come to the location of the servicing service. The service can be provided directly, i.e. synchronously, especially optionally in real time, as long as the operator and servicing service are in contact, e.g. by telephone. The servicing service can only access the operational setting data after authorization by the operator and only temporarily. All these properties contribute to a high level of acceptance and a high level of user comfort of the working devices for the operator.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A web-based working device system, comprising:
at least one working device;
a data provision apparatus comprising a non-transitory data memory for providing device information data and operational setting data relating to the working device;
a device-side data communication unit and a long-range data exchange connection between the device-side data communication unit and the data provision apparatus;
a device app with read/write access to the operational setting data relating to the working device in the data provision apparatus;
a user terminal for user-side operation of the device app;
a service app with read access to the device information data in the data provision apparatus and with temporary write access to the operational setting data relating to the working device that are provided by the data provision apparatus, wherein the temporary write access requires a user-side access enable via the device app; and
a service terminal for service-side operation of the service app, wherein
the temporary write access comprises part of temporary read/write access with write access for a predefined write access period and read access for a predefined read access period, wherein the read access period is equal to or longer than the write access period.

2. The web-based working device system according to claim 1, wherein
the device-side data communication unit is located in the working device or is formed by a communication intermediate station which is assigned a short-range data exchange connection to the working device.

3. The web-based working device system according to claim 1, wherein
the temporary write access of the service app to the operational setting data relating to the working device includes an access request from the service app to the device app for the working device, wherein the access request requires user-side enable.

4. The web-based working device system according to claim 3, wherein
the access request is a token-based access request and is selectable via a jump in the service app to the device app.

5. The web-based working device system according to claim 3, wherein
the device information data comprise device identification data which are used by the service app to identify the working device for at least one of the access request to the device app and the temporary write access to the operational setting data relating to the working device that are provided by the data provision apparatus.

6. A web-based working device system, comprising:
at least one working device;
a data provision apparatus comprising a non-transitory data memory for providing device information data and operational setting data relating to the working device;
a device-side data communication unit and a long-range data exchange connection between the device-side data communication unit and the data provision apparatus;
a device app with read/write access to the operational setting data relating to the working device in the data provision apparatus;
a user terminal for user-side operation of the device app;
a service app with read access to the device information data in the data provision apparatus and with temporary write access to the operational setting data relating to the working device that are provided by the data provision apparatus, wherein the temporary write access requires a user-side access enable via the device app; and
a service terminal for service-side operation of the service app,
wherein the service app prematurely terminates enabled temporary write access to the operational setting data relating to one of a plurality of working devices when it sends a new access request for temporary write access to the operational setting data relating to another working device to its associated device app.

7. The web-based working device system according to claim 6, wherein
the device-side data communication unit is located in the working device or is formed by a communication intermediate station which is assigned a short-range data exchange connection to the working device.

8. The web-based working device system according to claim 6, wherein the temporary write access of the service app to the operational setting data relating to the working device includes an access request from the service app to the device app for the working device, wherein the access request requires user-side enable.

9. The web-based working device system according to claim 8, wherein the access request is a token-based access request and is selectable via a jump in the service app to the device app.

10. The web-based working device system according to claim 8, wherein the device information data comprise device identification data which are used by the service app to identify the working device for at least one of the access request to the device app and the temporary write access to the operational setting data relating to the working device that are provided by the data provision apparatus.

11. The web-based working device system according to claim 6, wherein the user terminal is a smart device.

12. The web-based working device system according to claim 6, wherein the at least one working device is an autonomous working device or a gardening or forestry tool or a construction working device or a DIY device.

13. The web-based working device system according to claim 12, wherein the at least one working device is a robotic lawnmower or a chainsaw.

14. The web-based working device system according to claim 6, wherein the long-range data exchange connection is an Internet connection.

15. A data access method for accessing operational setting data relating to a working device that are provided by a data provision apparatus via a service app, the method comprising the steps of:

transmitting, on a user side, a service request comprising identification information and service request information for the working device;

receiving, on a service side, the service request, and sending an access request from the service app to a relevant device app for temporary write access to the operational setting data relating to the working device that are provided by the data provision apparatus;

wherein the access request is received on the user side via the device app and the requested temporary write access to the operational setting data relating to the working device that are provided by the data provision apparatus is enabled, wherein the operational setting data relating to the working device in the data provision apparatus is changeable by the service app by write access during the enabled temporary write access corresponding to the service request information, wherein the enabled temporary write access is automatically terminated after a predefined enable period has expired, and wherein enabled temporary write access to the operational setting data relating to one of a plurality of working devices is prematurely terminated when a new access request for temporary write access to the operational setting data relating to another working device is sent from the service app to its associated device app.

16. The data access method according to claim 15, wherein data are exchanged between a device-side data communication unit and the data provision apparatus via a long-range data exchange connection.

17. The data access method according to claim 15, wherein the device-side data communication unit is arranged in the working device or is formed as a communication intermediate station which exchanges data with the working device via a short-range data exchange connection.

18. The data access method according to claim 15, wherein the access request is formed by a token-based access request and is selected via a jump in the service app to the device app.

19. The data access method according to claim 15, wherein the service app uses device identification data as device information data for identifying the working device for at least one of the access request to the device app and the temporary write access to the operational setting data relating to the working device that are stored in the data provision apparatus.

20. The data access method according to claim 15, wherein the enable period for write access is predefined as the write access period and for read access is predefined as the read access period, wherein the read access period is predefined to be equal to or longer than the write access period.

* * * * *